United States Patent [19]

Shimada

[11] Patent Number: 5,577,123
[45] Date of Patent: Nov. 19, 1996

[54] PUBLIC-KEY CRYPTOGRAPHIC APPARATUS HANDLING CIPHERTEXT BY PUBLIC-KEY

[75] Inventor: Michio Shimada, Tokyo, Japan

[73] Assignee: NEC Corporation, Tokyo, Japan

[21] Appl. No.: 388,484

[22] Filed: Feb. 14, 1995

[30] Foreign Application Priority Data

Feb. 14, 1994 [JP] Japan .................................. 6-039122

[51] Int. Cl.$^6$ ........................................... H04L 9/30
[52] U.S. Cl. ............................. 380/30; 380/28; 380/49
[58] Field of Search ................................. 380/30, 42, 43, 380/49, 50, 28, 9

[56] References Cited

U.S. PATENT DOCUMENTS

| | | | |
|---|---|---|---|
| 4,405,829 | 9/1983 | Rivest et al. ............................. | 380/30 |
| 4,658,094 | 4/1987 | Clark ........................................ | 380/28 |
| 5,068,895 | 11/1991 | Shimada .................................... | 380/28 |
| 5,301,235 | 4/1994 | Shimada .................................... | 380/42 |

FOREIGN PATENT DOCUMENTS

| | | |
|---|---|---|
| 277280 | 11/1989 | Japan . |
| 83244 | 4/1993 | Japan . |
| 91101 | 4/1993 | Japan . |

OTHER PUBLICATIONS

IEICE Technical Report, published Jul. 13, 1992.
Okamoto, "An Introduction to the Cryptographic Theory", Kyoritsu Publishing Company, 1993, pp. 88–99.

M. Shimada et al., "Another Practical Public–Key Cryptosystem", *Electronics Letters*, 5th Nov., 1991, vol. 28, No. 23, pp. 2146–2147.

M. Shimada et al., "Blocking Method for RSA Cryptosystem without Expanding Cipher Length", *Electronics Letters*, 8th Jun., 1989, vol. 25, No. 12, pp. 773–774.

D. E. Robling Denning, "Cryptography and Data Security", Addison–Wesley Publishing Company, Inc. 1982.

*Primary Examiner*—Thomas H. Tarcza
*Assistant Examiner*—Pinchus M. Laufer
*Attorney, Agent, or Firm*—Sughrue, Mion, Zinn, Macpeak & Seas

[57] ABSTRACT

The invention provides a public-key cryptographic apparatus which does not leak information regarding a plaintext and can prevent an increase in block length. A quadratic residue calculation circuit calculates a residue when the square of the lower n-1 bits of the plaintext of n bits is divided by public-key, and an exclusive OR circuit calculates an exclusive OR of the least significant bit of a result of the calculation and the most significant bit of the plaintext. Then, public-key encipherment such as the RSA cryptosystem or a modified Rabin cryptosystem is performed twice repetitively for totaling n bits of the output of exclusive OR circuit and the lower n-1 bits of plaintext by public-key enciphering circuits so as to make it impossible to estimate the most significant bit of the plaintext from the ciphertext.

5 Claims, 4 Drawing Sheets

PUBLIC-KEY CRYPTOGRAPHIC APPARATUS HANDLING CIPHERTEXT BY PUBLIC-KEY

BACKGROUND OF THE INVENTION (1) Field of the Invention

This invention relates to a public-key cryptographic apparatus which enciphers communication data so that the communication data may not be wiretapped by a third party, and more particularly to a public-key cryptographic apparatus which can prevent an increase in block length arising from encipherment with a public-key.

(2) Description of the Related Art

One of methods for enciphering communication data so that the communication data may not be wiretapped by a third party is a public-key cryptosystem. As such public-key cryptosystems, the RSA cryptosystem and the modified Rabin cryptosystems are known. According to those cryptosystems, where the public-key is represented by N, a calculation by means of mod N is performed to convert plaintext M into ciphertext C (For example, the calculation in RSA cryptosystem is performed in $C=M^e$ mod N).

The RSA cryptosystem is disclosed in detail, for example, in Dorothy Elizabeth Robling Denning, "Cryptography and Data Security", Addison-Wesley Publishing Company, Inc., 1982 or Okamoto, "An introduction to the Cryptographic Theory", Kyoritsu Publishing Company, 1993.

Meanwhile, the modified Rabin cryptosystems are disclosed, for example, in M. Shimada, who is the inventor of the present invention, "Another Practical Public-Key Cryptosystems", Electronic Letters, 5th November, 1992, Vol. 28, No. 23, pp.2146–2147 or Hayashi and Shimizu, "Uniquely Decodeable Rabin Type Cryptosystems", Report of Technical Investigations of the Electronic Information Communications Society of Japan, 1992, Vol. 92, No. 134, pp.29–32.

By the way, the size of plaintext M which can be enciphered by the public-key cryptosystems is limited to 0 or greater than 0 and smaller than N, and the public-key N is a product of two primes but not a power of 2. Accordingly, according to the public-key cryptosystems, where the number of digits of public-key N is n bits, only plaintext of the length of n-1 bits or fewer can be enciphered. In other words, the public-key cryptosystems have a problem in that the enciphering operation increases the block length by at least one bit.

Therefore, various public-key cryptographic apparatus which prevent the increase in block length have conventionally been proposed (for example, Japanese Patent Laid-Open Application No. Heisei 1-277280 or Japanese Patent Laid-Open Application No. Heisei 5-91101). An outline is described below with reference to FIG. 1. Referring to FIG. 1, plaintext M of the length of n bits is inputted from input terminal 232 and supplied to comparator 101, selector 103 and public-key enciphering circuit 102.

Where the integer of n bits is represented by A, public-key enciphering circuit 102 enciphers integer A by public-key encipherment using public-key N inputted from input terminal 231 and outputs a resulted ciphertext to selector 103. Comparator 101 compares public-key N inputted thereto from input terminal 231 with integer A and outputs a result of the comparison to selector 103. Selector 103 selects and outputs integer A if $A \geq N$, but selects and outputs the output of public-key enciphering circuit 102 if A<N.

Then, the most significant bit is separated from the output of n bits of selector 103 and is inputted to and inverted by NOT circuit 123 (inverter), and then it is added as the most significant bit to the lower n-1 bits of the output of selector 103 to construct an integer of n bits again. The integer of n bits is supplied to comparator 111, selector 113 and public-key enciphering circuit 112.

Where the integer of n bits is represented by B, public-key enciphering circuit 112 enciphers integer B by public-key encipherment using public-key N inputted thereto from input terminal 231 and outputs the resulting ciphertext to selector 113. Comparator 111 compares public-key N inputted thereto from input terminal 231 with integer B and outputs the result of the comparison to selector 113. Selector 113 selects 10 and outputs integer B if $B \geq N$, but selects and outputs the output of public-key enciphering circuit 112 if B<N. The output of selector 113 is outputted as a ciphertext from output terminal 233.

By the procedure described above, a plaintext M of the length of n bits can be converted into a ciphertext of the length of n bits. Further, since the most significant bit of the output of selector 103 is inverted by NOT circuit 123, and no matter which value the plaintext assumes, the plaintext is enciphered by either one or both of public-key enciphering circuits 102 and 112.

With the cryptographic apparatus of FIG. 1, however, if ciphertext C is greater than public-key N, it can be discriminated that plaintext M is smaller than public-key N. Accordingly, the cryptographic apparatus is disadvantageous in that, when public-key N has a value proximate to $2^{n-1}$ the most significant bit of plaintext M can be estimated at a high probability from ciphertext C.

Therefore, in applications which require safety, a countermeasure to repeat a public-key enciphering operation three or more times using, for example, a cryptographic apparatus having such a construction as shown in FIG. 2 is conventionally adopted in order to prevent leakage of the value of the most significant bit of a plaintext. Operation of the cryptographic apparatus when the number of repetitions is three is described below with reference to FIG. 2.

Referring to FIG. 2, plaintext M of the length of n bits is inputted from input terminal 332 to selector 302. Meanwhile, a control signal is supplied from input terminal 342 so that selector 302 may selectively output a value inputted from input terminal 332. The output of selector 302 is inputted to random function generator 303.

Random function generator 303 performs predetermined one-by-one conversion for an input thereto as hereinafter described in detail and supplies the result of the conversion to comparator 101, selector 103 and public-key enciphering circuit 102.

Where the output of random function generator 303 is represented by A, public-key enciphering circuit 102 enciphers integer A by public-key encipherment using public-key N inputted thereto from input terminal 331 and outputs a resulted ciphertext to selector 103. Comparator 101 compares public-key N inputted thereto from input terminal 331 with integer A and outputs a result of the comparison to selector 103. Selector 103 selects and outputs integer A if $A \geq N$ according to the comparison by comparator 101, but selects and outputs the output of public-key enciphering circuit 102 if A<N.

Then, a control signal is supplied from input terminal 341, and the output of selector 103 is stored into register 301. The value stored in register 301 is supplied to selector 302. Then, another control signal is supplied from input terminal 342 so that selector 302 may select and output the value inputted thereto from register 301.

Next, after a predetermined interval of time (delay time until the output of selector 103 is settled after the output of selector 302 is settled) elapses, a control signal is supplied from input terminal 341 again so that the output of selector 103 is stored into register 301.

Finally, after another predetermined interval of time elapses, the output of selector 103 is outputted as a ciphertext from output terminal 333. If a public-key enciphering operation is repeated three times in the manner described above, it becomes difficult to estimate the most significant bit of the plaintext from the resulted ciphertext.

It is to be noted that random function generator 303 of the cryptographic apparatus of FIG. 2 is 10 constructed, for example, in such a manner as shown in FIG. 3. Referring to FIG. 3, the most significant bit of the input of n bits of a random function is supplied to NOT circuit 401; the upper b bits following the most significant bit are supplied to exclusive OR circuit 402; the following lower a bits are supplied to hash function generator 403 and output terminal 412; and the remaining n-a-b-1 bits are supplied as they are to output terminal 412.

NOT circuit 401 inverts the bit inputted thereto and supplies a result of the inversion to output terminal 412. NOT circuit 401 changes the input value equal to or greater than N to another value smaller than N, similarly to NOT circuit 123 of FIG. 1.

Hash function generator 403 applies predetermined conversion to the a bits inputted thereto and outputs the result of the conversion of b bits. Particularly, hash function generator 403 is constituted from a read only memory in which predetermined random values are written therein, and outputs a value of b bits stored in an address designated by an input thereto.

Exclusive OR circuit 402 calculates an exclusive OR of the b bits of a integer of n bits inputted to input terminal 411 and corresponding bits of the output of hash function generator 403, and supplies the result of the exclusive OR calculation for the individual bits to output terminal 412.

From output terminal 412, the output of NOT circuit 401 is outputted as the most significant bit; the output of exclusive OR circuit 402 is outputted as the upper b bits following the most significant bit; the n-a-b-1 bits supplied directly from input terminal 411 are outputted as the bits following the upper b bits; and the a bits inputted to hash function generator 403 are outputted as the lower a bits.

With the conventional system, however, since the number of times by which public-key encipherment and processing based on a hash function are repeated must be set to three or more in order to prevent possible leakage of the most significant bit, there is a problem in that, if it is tried to prevent leakage of information completely, the data rate is lowered.

SUMMARY OF THE INVENTION

Taking the problems of the conventional public-key cryptographic apparatus described above into consideration, it is an object of the present invention to provide a public-key cryptographic apparatus which can encipher a plaintext without leaking information regarding the plaintext and without increasing the block length.

It is another object of the present invention to provide a public-key cryptographic apparatus which can perform encipherment without decreasing the data rate.

These objects of the present invention can be attained by a public-key cryptographic apparatus which includes a first comparator for comparing in magnitude a public-key of n bits inputted thereto with a given first integer, a first public-key enciphering circuit for enciphering the first integer using the public-key to output a first ciphertext, a first selector for selectively outputting the first ciphertext or the first integer in accordance with a result of the comparison by the first comparator, a NOT circuit for inverting the logic level of the most significant bit of the output of the first selector, second integer transmission means for transmitting a second integer whose most significant bit is the output of the NOT circuit and whose lower bits following the most significant bit are lower bits following the most significant bit of the output of the first selector, a second comparator for comparing in magnitude the public-key with the second integer with each other in magnitude, a second public-key enciphering circuit for enciphering the second integer using the public-key to output a second ciphertext, and a second selector for selectively outputting the second ciphertext or the second integer in accordance with the result of the comparison by the second comparator, the public-key cryptographic apparatus comprising a quadratic residue calculation circuit for calculating a residue when the square of the lower n-1 bits of the inputted plaintext of n bits is divided by the public-key, an exclusive OR circuit for calculating the exclusive OR of the most significant bit of the plaintext and the least significant bit of the residue, and first integer transmission means for transmitting the first integer whose most significant bit is the output of the exclusive OR circuit and whose lower bits following the most significant bit are the lower n-1 bits of the plaintext to the first comparator, the first public-key enciphering apparatus and the first selector.

Preferably, the first selector selectively outputs, based on the result of the comparison by the first comparator, the first integer when the first integer is equal to or greater than the public-key, but selectively outputs the first ciphertext from the first public-key enciphering circuit when the first integer is smaller than the public-key, and the second selector selectively outputs, based on the result of the comparison by the second comparator, the second integer when the second integer is equal to or greater than the public-key, but selectively outputs the second ciphertext from the second public-key enciphering circuit when the second integer is smaller than the public-key.

Preferably, each of the first and second enciphering apparatus generates an RSA ciphertext or a modified Rabin ciphertext, and each of the first and second integer transmission means has wiring lines for n bits.

Preferably, the first and second selectors select the first and second ciphertexts when, where the public-key is an integer N of n bits, the first and second public-key enciphering apparatus encipher the first and second integers, which are each equal to or higher than 0 but lower than N, into the first and second ciphertexts, which are each equal to or higher than 0 but lower than N, in a one-by-one corresponding relationship to each other, respectively.

As apparent from the construction of the present invention described above, leakage of the most significant bit of a plaintext can be prevented completely by adding a pseudo-random number of 1 bit to the most significant bit of the plaintext by exclusive OR calculation. In particular, where a pseudo-random number of 1 bit is added to the most significant bit of a plaintext by exclusive OR calculation, even if it is known, for example, that the plaintext is smaller than public-key N, the value of the most significant bit of the plaintext cannot be estimated. This is because, if the probability that the pseudo-random number may be 1 is ½, one half of values which are smaller than public-key N have the value 1 at the most significant bit thereof. If leakage of the most significant bit of a plaintext can be prevented completely, naturally the number of times for public-key encipherment can be reduced to twice or less.

Naturally, however, the pseudo-random number must be difficult to estimate from the ciphertext. Further, the pseudo-random number must be generated relying only upon the plaintext except for the most significant bit. If the pseudo-random number is generated based on information other than the plaintext, then since the information is also required to decipher the ciphertext back into the plaintext, the transmission efficiency is degraded by transmission of the information.

Therefore, in the present invention, x, which is a plaintext except the most significant bit, is enciphered into a Rabin ciphertext, that is, $x^2 \mod N$ is calculated for x, and the lowermost bit of the Rabin ciphertext is employed as the pseudo-random number. By this method, a pseudo-random number can be generated relying only upon a plaintext. Further, since decipherment of a Rabin ciphertext is as difficult as the problem of factorization of public-key N into prime factors, the value of the pseudo-random number could not be estimated from the ciphertext.

It is to be noted that any public-key ciphertext can be employed as the public-key ciphertexts used by the first and second public-key enciphering circuits only if it can establish a one-by-one corresponding relationship between a set of integers equal to or greater than 0 but smaller than N and another set of integers greater than 0 but smaller than N.

The above and other objects, features, and advantages of the present invention will become apparent from the following description referring to the accompanying drawings which illustrate an example of a preferred embodiment of the present invention.

DETAILED DESCRIPTION OF THE PREFERRED EMBODIMENT

An embodiment of the present invention is described below with reference to the drawings.

Figure 4:
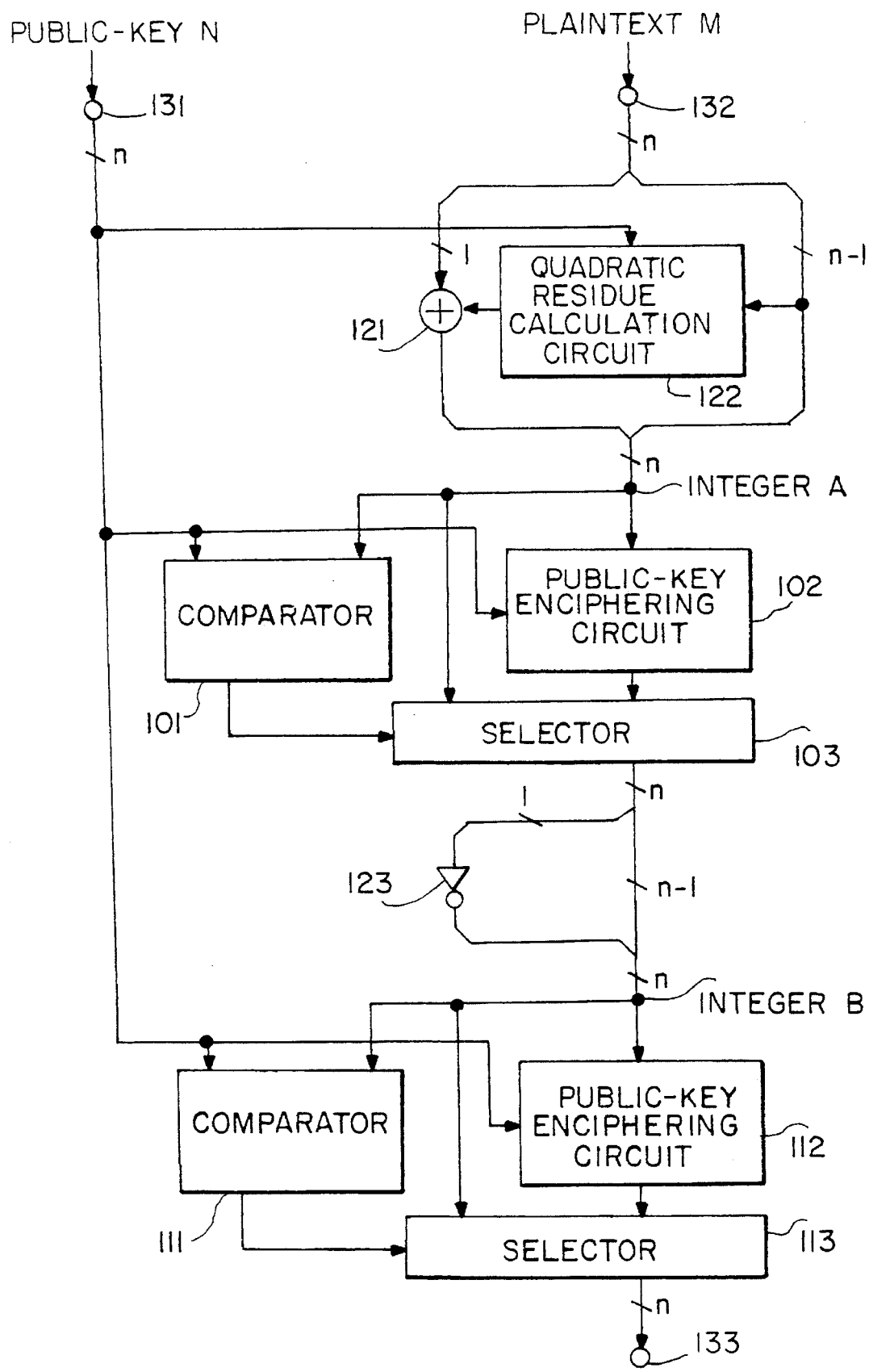
FIG. 4 is a block diagram showing the construction of a public-key cryptographic apparatus according to an embodiment of the present invention.

FIG. 4 shows a public-key cryptographic apparatus according to an embodiment of the present invention. The public-key cryptographic apparatus of the present invention includes exclusive OR circuit 121 and quadratic residue calculation circuit 122 both provided on the input side of the apparatus shown in FIG. 1.

Referring to FIG. 4, plaintext M of the length of n bits is inputted from input terminal 132. The lower n-1 bits of plaintext M are inputted to quadratic residue calculation circuit 122 while the most significant bit of plaintext M is inputted to exclusive OR circuit 121.

Quadratic residue calculation circuit 122 calculates $x^2 \mod N$, that is, a residue when the square of x is divided by N where x is the lower n-1 bits of the inputted plaintext and N is the public-key inputted from input terminal 131. Quadratic residue calculation circuit 122 outputs the least significant bit of the residue as a pseudo-random number to exclusive OR circuit 121.

Exclusive OR circuit 121 calculates an exclusive OR of both the most significant bit of plaintext M and the output of quadratic residue calculation circuit 122. The output of exclusive OR circuit 121 is added as the most significant bit to the lower n-1 bits of plaintext M to construct integer A of n bits. Integer A thus constructed is supplied to comparator 101, selector 103 and public-key enciphering circuit 102.

Public-key enciphering circuit 102 enciphers integer A by public-key encipherment using public-key N inputted from input terminal 131 and outputs the resulting ciphertext to selector 103. Comparator 101 compares public-key N inputted thereto from input terminal 131 with integer A and outputs the result of the comparison to selector 103. Selector 103 selects and outputs integer A when the result of the comparison is A≧N, but selects and outputs the output of public-key enciphering circuit 102 if the result of the comparison is A<N.

Then, the most significant bit is separated from the output of n bits of selector 103 and inputted to NOT circuit 123, by which it is inverted. The output of NOT circuit 123 is added to the lower n-1 bits of the output of selector 103 to construct an integer of n bits again. The integer of n bits is supplied to comparator 111, selector 113 and public-key enciphering circuit 112.

Where the integer of n bits is represented by B, public-key enciphering circuit 112 enciphers integer B by public-key encipherment using public-key N inputted thereto from input terminal 131 and outputs a resulted ciphertext to selector 113.

Comparator 111 compares public-key N inputted thereto from input terminal 1.31 with integer B and outputs the result of the comparison to selector 113. Selector 113 selects and outputs integer B if B≧N, but selects and outputs the output of public-key enciphering circuit 112 if B<N. The output of selector 113 is outputted as a ciphertext from output terminal 133.

In summary, the public-key cryptographic apparatus of the present invention calculates, by means of quadratic residue calculation circuit 122, a residue when the square of the lower n-1 bits of plaintext M of n bits in length is divided by public-key N, and calculates, by means of exclusive OR circuit 121, an exclusive OR between the least significant bit of a result of the calculation and the most significant bit of plaintext M. Thereafter, a conventional public-key enciphering operation to which a method of preventing an increase in block length is applied, that is, public-key encipherment such as the RSA cryptosystem or a modified Rabin cryptosystem, is repeated twice for the output of exclusive OR circuit 121 and the lower n-1 bits of plaintext M in order to make it impossible to estimate the most significant bit of the plaintext from the ciphertext.

Figure 1:
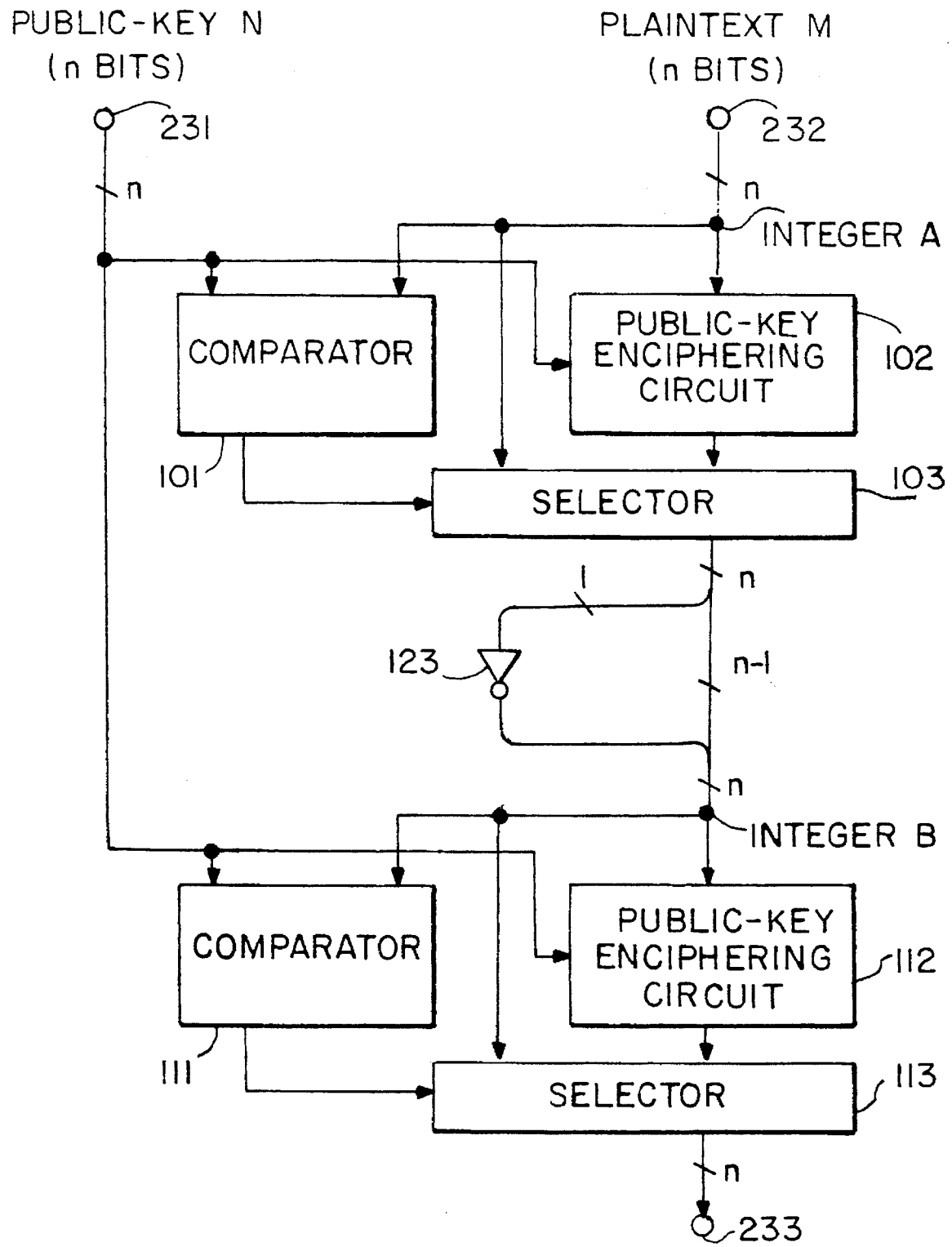
FIG. 1 is a block diagram showing the construction of a conventional public-key cryptographic apparatus.
Figure 2:
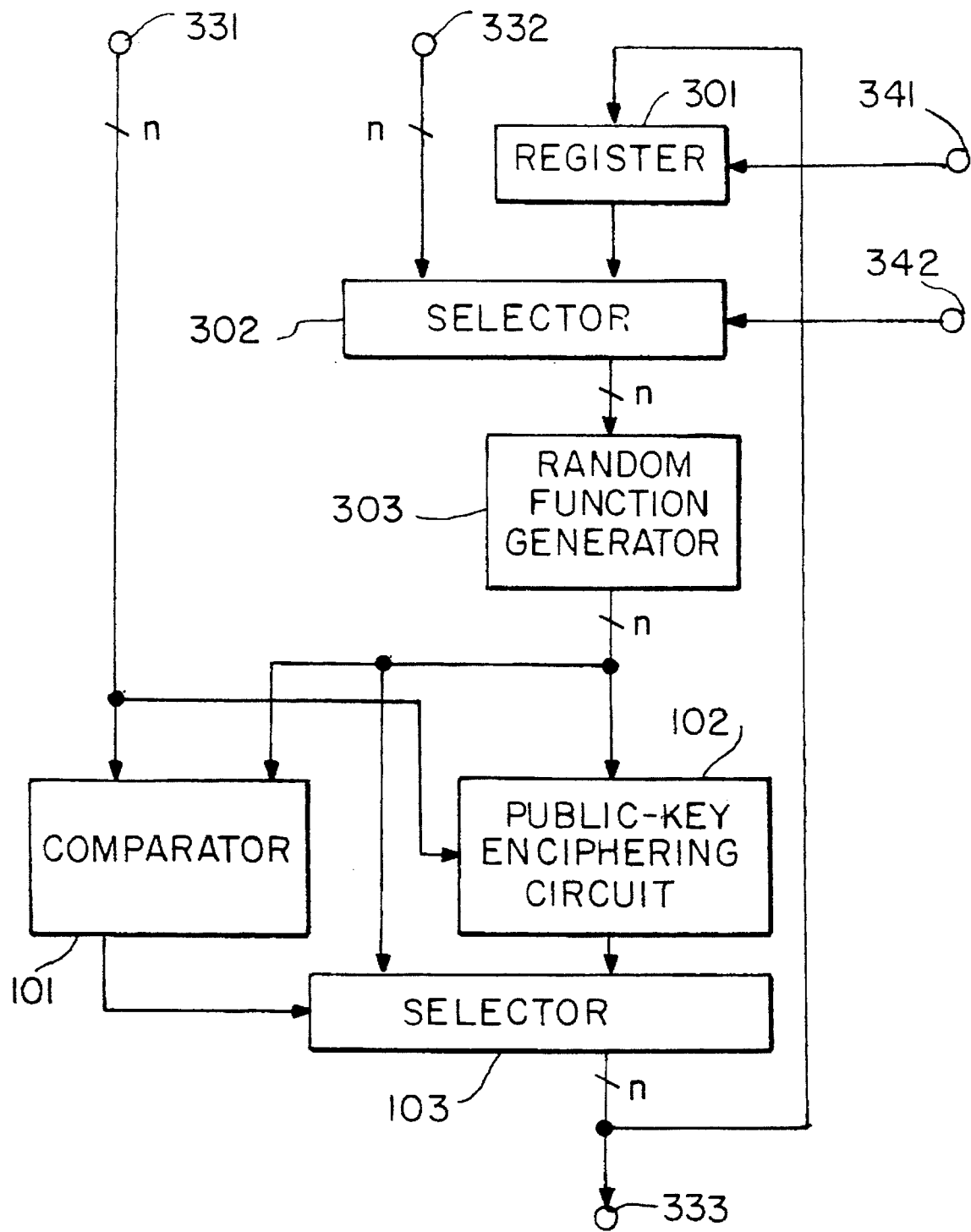
FIG. 2 is a block diagram showing the construction of another conventional public-key cryptographic apparatus.
Figure 3:
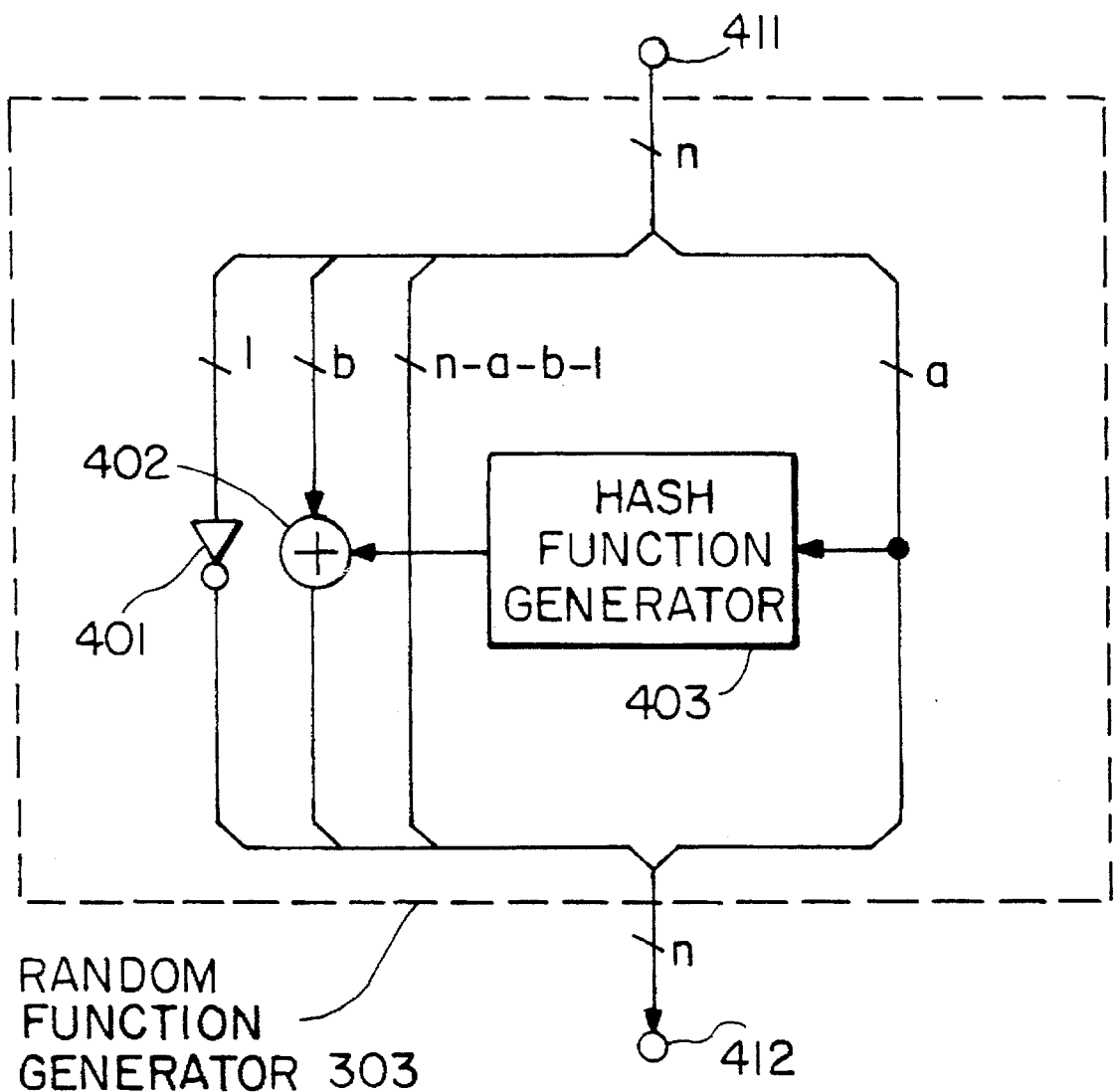
FIG. 3 is a block diagram showing the construction of a random function generator employed in a conventional public-key cryptographic apparatus.

It is to be noted that decipherment from the ciphertext to the original plaintext may be performed by applying the operations performed by the cryptographic apparatus of FIG. 1 reversely to the ciphertext.

As apparent from the foregoing description, according to the public-key cryptographic apparatus of the present invention, since conventional public-key encipherment to which a method for preventing an increase in block length is applied is performed after a pseudo-random number is added to the most significant bit of a plaintext, estimation of the most significant bit of the plaintext can be made impossible by repeating public-key encipherment such as the RSA cryptosystem or a modified Rabin cryptosystem only twice. Accordingly, not only an increase in block length can be prevented, but also leakage of information regarding the plain text can be prevented without lowering the data rate.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A public-key cryptographic apparatus which includes a first comparator for comparing in magnitude a public-key of n bits inputted thereto with a given first integer, a first public-key enciphering circuit for enciphering the first integer using the public-key to output a first ciphertext, a first selector for selectively outputting the first ciphertext or the first integer in accordance with a result of the comparison by said first comparator, a NOT circuit for inverting the logic level of the most significant bit of the output of said first selector, second integer transmission means for transmitting a second integer whose most significant bit is the output of said NOT circuit and whose lower bits following the most significant bit are the lower bits following the most significant bit of the output of said first selector, a second comparator for comparing in magnitude the public-key with the second integer, a second public-key enciphering circuit for enciphering the second integer using the public-key to output a second ciphertext, and a second selector for selectively outputting the second ciphertext or the second integer in accordance with a result of the comparison by said second comparator, said public-key cryptographic apparatus comprising:

a quadratic residue calculation circuit for calculating a residue when the square of the lower n-1 bits of the inputted plaintext of n bits is divided by the public-key;

an exclusive OR circuit for calculating an exclusive OR of the most significant bit of the plaintext and the least significant bit of the residue; and first integer transmission means for transmitting the first integer whose most significant bit is the output of said exclusive OR circuit and whose lower bits following the most significant bit are the lower n-1 bits of the plaintext to said first comparator, said first public-key enciphering apparatus and said first selector.

2. A public-key cryptographic apparatus as claimed in claim 1, wherein said first selector selectively outputs, based on the result of the comparison by said first comparator, the first integer when the first integer is equal to or greater than the public-key, but selectively outputs the first ciphertext from said first public-key enciphering circuit when the first integer is smaller than the public-key, and said second selector selectively outputs, based on the result of the comparison by said second comparator, the second integer when the second integer is equal to or greater than the public-key, but selectively outputs the second ciphertext from said second public-key enciphering circuit when the second integer is smaller than the public-key.

3. A public-key cryptographic apparatus as claimed in claim 1, wherein each of said first and second enciphering apparatus generates an RSA ciphertext or a modified Rabin ciphertext.

4. A public-key cryptographic apparatus as claimed in claim 1, wherein each of said first and second integer transmission means has wiring lines for n bits.

5. A public-key cryptographic apparatus as claimed in claim 1, wherein said first and second selectors select the first and second ciphertexts respectively when, where the public-key is an integer N of n bits, said first and second public-key enciphering apparatus encipher the first and second integers respectively, which are each equal to or higher than 0 but lower than N, into the first and second ciphertexts respectively, which are each equal to or higher than 0 but lower than N.

* * * * *